US009131729B2

(12) United States Patent
Newman

(10) Patent No.: US 9,131,729 B2
(45) Date of Patent: Sep. 15, 2015

(54) SAFE AND EFFICIENT THERMAL TRANSFER MEDIA FOR PROCESSING OF FOOD AND DRINK PRODUCTS

(71) Applicant: ICS Solutions B.V., Amsterdam (NL)

(72) Inventor: Paul Bernard Newman, Fallbrook, CA (US)

(73) Assignee: ICS SOLUTIONS B.V., Amsterdam (NL)

(*) Notice: Subject to any disclaimer, the term of this patent is extended or adjusted under 35 U.S.C. 154(b) by 0 days.

(21) Appl. No.: 13/624,411

(22) Filed: Sep. 21, 2012

(65) Prior Publication Data

US 2013/0078349 A1 Mar. 28, 2013

Related U.S. Application Data

(60) Provisional application No. 61/540,010, filed on Sep. 28, 2011.

(51) Int. Cl.
A23B 7/152 (2006.01)
A23L 3/02 (2006.01)
C09K 5/10 (2006.01)

(52) U.S. Cl.
CPC .... A23L 3/02 (2013.01); C09K 5/10 (2013.01)

(58) Field of Classification Search
CPC ............................... A23B 7/152; A23B 79/22
See application file for complete search history.

(56) References Cited

U.S. PATENT DOCUMENTS

| 1,419,139 | A | 6/1922 | Hunter |
| 1,868,996 | A | 7/1932 | Sharp |
| 1,923,421 | A | 8/1933 | Chapman |
| 2,556,385 | A | 6/1951 | Allan |
| 2,595,708 | A | 5/1952 | Salfisberg et al. |
| 2,633,284 | A | 3/1953 | Moffett et al. |
| 2,660,512 | A | 11/1953 | Webster |
| 2,806,423 | A | 9/1957 | Van Der Winden |
| 2,818,012 | A | 12/1957 | Webster |
| 2,870,954 | A | 1/1959 | Kulesza |
| 2,968,232 | A | 1/1961 | Carvallo |
| 2,976,988 | A | 3/1963 | Schneider |
| 3,088,180 | A | 5/1963 | Lauterbach |
| 3,286,619 | A | 11/1966 | Lee |
| 3,377,173 | A | 4/1968 | Winden |
| 3,394,793 | A | 7/1968 | Reimers et al. |
| 3,407,721 | A | 10/1968 | Carvallo |
| 3,469,988 | A | 9/1969 | Yawger |
| 3,478,677 | A | 11/1969 | Mencacci |
| 3,545,985 | A | 12/1970 | Mencacci et al. |
| 3,637,132 | A | 1/1972 | Gray |
| 3,927,976 | A | 12/1975 | Reimers et al. |
| 3,960,670 | A | 6/1976 | Pflug |
| 4,067,691 | A | 1/1978 | McGady et al. |
| 4,116,117 | A | 9/1978 | Bogaard |
| 4,196,225 | A | 4/1980 | Mencacci |
| 4,206,299 | A | 6/1980 | Yamazaki et al. |
| 4,295,566 | A | 10/1981 | Vincek |
| 4,389,371 | A | 6/1983 | Wilson et al. |
| 4,396,582 | A | 8/1983 | Kodera |
| 4,476,263 | A | 10/1984 | Owens |
| 4,522,015 | A | 6/1985 | Hildebolt |
| 4,547,383 | A | 10/1985 | Goldhahn |
| 4,631,115 | A | 12/1986 | Berg et al. |
| 4,739,699 | A | 4/1988 | Nelson et al. |
| 4,816,269 | A | 3/1989 | Nelson et al. |
| 4,861,559 | A | 8/1989 | Sugisawa et al. |
| 4,990,347 | A | 2/1991 | Rasmussen et al. |
| 5,141,662 | A | 8/1992 | Dexheimer et al. |
| 5,160,755 | A | 11/1992 | Mignogna et al. |
| 5,218,829 | A | 6/1993 | DeJarnette |
| 5,240,725 | A | 8/1993 | Akamatsu et al. |
| 5,283,033 | A | 2/1994 | Dodrill |

(Continued)

FOREIGN PATENT DOCUMENTS

DE 881896 7/1953
DE 2334443 2/1975

(Continued)

OTHER PUBLICATIONS

Nelson, "Principles of Aseptic Processing and Packaging", 2010, pp. 3-46, 101-150.
U.S. Appl. No. 13/449,718, "Non-Final Office Action", Nov. 22, 2013, 12 pages.
U.S. Appl. No. 13/449,718, "Response to Restriction Requirement", Oct. 28, 2013, 5 pages.
U.S. Appl. No. 13/449,718, "Restriction Requirement", Sep. 26, 2013, 6 pages.
U.S. Appl. No. 13/450,693, "Non-Final Office Action", Nov. 8, 2013, 32 pages.
U.S. Appl. No. 13/450,693, "Response to Non-Final Office Action", Mar. 7, 2014, 30 pages.
U.S. Appl. No. 13/450,693, "Response to Restriction Requirement", Oct. 17, 2013, 7 pages.
U.S. Appl. No. 13/450,693, "Restriction Requirement", Sep. 17, 2013, 6 pages.

(Continued)

Primary Examiner — Necholus Ogden, Jr.
(74) Attorney, Agent, or Firm — Christensen O'Connor Johnson Kindness PLLC

(57) ABSTRACT

A family of novel thermal processing and transfer media has been designed for optimized food and drink processing. These media composed solely of compounds approved to contact food, are essentially free of water, do not change state at any point in the process, remain corrosion-free throughout their useable life. While in combination with novel processing apparatus and methodologies, food and drink products requiring any heating, holding or cooling can be processed within the same equipment configurations essentially with no/minimal need for additional pressurization, the use of unheated modified atmospheres, in conjunction with these novel media, can be used to change or control the atmospheres within containers, especially polymer based containers, at specific locations within the processing cycle. It further relates to using different media compositions for each processing stage modified to optimize the thermal conductivity and thermal diffusivity properties of the foodstuff being processed, minimizing costs and maximizing quality.

18 Claims, No Drawings

(56) References Cited

U.S. PATENT DOCUMENTS

| | | | |
|---|---|---|---|
| 5,307,985 | A | 5/1994 | Beizermann |
| 5,351,828 | A | 10/1994 | Becker et al. |
| 5,368,093 | A | 11/1994 | Takehashi |
| 5,370,174 | A | 12/1994 | Silvestrini et al. |
| 5,478,990 | A | 12/1995 | Montanari et al. |
| 5,484,547 | A | 1/1996 | Mendoza |
| 5,696,686 | A | 12/1997 | Sanka et al. |
| 5,711,984 | A | 1/1998 | Woodward et al. |
| 5,747,085 | A | 5/1998 | Veltman et al. |
| 5,759,486 | A | 6/1998 | Peterson |
| 5,839,832 | A | 11/1998 | Hagino |
| 5,857,312 | A | 1/1999 | Walden |
| 5,872,359 | A | 2/1999 | Stewart et al. |
| 5,894,929 | A | 4/1999 | Kai et al. |
| 6,017,572 | A | 1/2000 | Meyer |
| 6,025,189 | A | 2/2000 | Bolea et al. |
| 6,071,474 | A | 6/2000 | Martinsen et al. |
| 6,086,782 | A | 7/2000 | Hsu et al. |
| 6,090,425 | A | 7/2000 | Samimi |
| 6,096,358 | A | 8/2000 | Murdick et al. |
| 6,148,249 | A | 11/2000 | Newman |
| 6,251,337 | B1 | 6/2001 | Kane |
| 6,389,828 | B1 | 5/2002 | Thomas |
| 6,416,711 | B2 | 7/2002 | Weng |
| 6,440,361 | B2 | 8/2002 | Weng |
| 6,472,008 | B2 | 10/2002 | Weng |
| 6,868,873 | B2 | 3/2005 | Frisk |
| 7,008,501 | B2 | 3/2006 | Lohwasser et al. |
| 7,008,659 | B1 | 3/2006 | Ono |
| 7,141,102 | B2 | 11/2006 | Fukutani et al. |
| 7,178,555 | B2 | 2/2007 | Engel et al. |
| 7,396,521 | B2 | 7/2008 | Hwang |
| 7,452,561 | B2 | 11/2008 | Newman |
| 7,475,786 | B2 | 1/2009 | McVay |
| 7,533,512 | B2 | 5/2009 | Levati et al. |
| 7,543,455 | B1 | 6/2009 | Chen |
| 7,666,457 | B1 | 2/2010 | Lang et al. |
| 7,846,486 | B2 | 12/2010 | Camu |
| 7,880,887 | B2 | 2/2011 | Olson et al. |
| 7,985,349 | B2 | 7/2011 | Yang et al. |
| 8,181,474 | B2 | 5/2012 | Chen |
| 8,206,607 | B2 | 6/2012 | Evans et al. |
| 8,479,532 | B2 | 7/2013 | Cocchi et al. |
| 8,575,525 | B2 | 11/2013 | Mackay et al. |
| 2001/0041150 | A1 | 11/2001 | Weng |
| 2003/0211212 | A1 | 11/2003 | Belongia et al. |
| 2005/0040251 | A1 | 2/2005 | Daly |
| 2005/0123435 | A1 | 6/2005 | Cutler et al. |
| 2005/0253109 | A1 | 11/2005 | Tran et al. |
| 2006/0038159 | A1 | 2/2006 | Fukutani et al. |
| 2006/0051639 | A1 | 3/2006 | Yang et al. |
| 2007/0122335 | A1 | 5/2007 | Hwang |
| 2007/0160494 | A1 | 7/2007 | Sands |
| 2007/0275178 | A1 | 11/2007 | Nishi et al. |
| 2007/0293980 | A1 | 12/2007 | Gudjonsson et al. |
| 2008/0048147 | A1 | 2/2008 | Eaton |
| 2008/0152537 | A1 | 6/2008 | Wild et al. |
| 2008/0311259 | A1 | 12/2008 | Singh et al. |
| 2008/0315152 | A1 | 12/2008 | Daly |
| 2009/0057607 | A1 | 3/2009 | Evans et al. |
| 2009/0081417 | A1 | 3/2009 | Schmal et al. |
| 2009/0142223 | A1 | 6/2009 | Hyde et al. |
| 2009/0169693 | A1 | 7/2009 | Hoffman |
| 2009/0178928 | A1 | 7/2009 | Groos et al. |
| 2009/0191318 | A1 | 7/2009 | Cocchi et al. |
| 2009/0238937 | A1 | 9/2009 | Yamazaki et al. |
| 2009/0301118 | A1 | 12/2009 | Chen |
| 2009/0301119 | A1 | 12/2009 | Chen |
| 2010/0006796 | A1 | 1/2010 | Yang et al. |
| 2010/0119670 | A1* | 5/2010 | Mazzariello ............ 426/320 |
| 2010/0173060 | A1 | 7/2010 | Perren et al. |
| 2010/0178404 | A1 | 7/2010 | Yoakim et al. |
| 2011/0104350 | A1 | 5/2011 | Clüsserath et al. |

FOREIGN PATENT DOCUMENTS

| | | |
|---|---|---|
| DE | WO 2006/092376 A1 | 9/2006 |
| DE | 102009018489 | 10/2010 |
| EP | 362975 | 4/1990 |
| EP | 808631 | 11/1997 |
| EP | 990689 | 4/2000 |
| EP | 1359097 | 11/2003 |
| EP | 1964785 | 9/2008 |
| EP | 2177116 | 4/2010 |
| EP | 2223618 | 9/2010 |
| EP | 2574243 B1 | 4/2014 |
| GB | 1206061 | 9/1970 |
| GB | 2285126 | 6/1995 |
| GB | 2408440 | 6/2005 |
| GB | 2427601 | 1/2007 |
| GB | 2449288 | 11/2008 |
| JP | 2007-161807 | 6/2007 |
| JP | 2011012166 | 1/2011 |
| WO | 8804145 | 6/1988 |
| WO | 9611592 | 4/1996 |
| WO | 9807452 | 2/1998 |
| WO | 0027227 | 5/2000 |
| WO | 0027229 | 5/2000 |
| WO | 0221928 | 3/2002 |
| WO | 0237975 | 5/2002 |
| WO | WO 03/018706 A1 | 3/2003 |
| WO | 2004017741 | 3/2004 |
| WO | 2007020469 | 2/2007 |
| WO | 2008093367 | 8/2008 |
| WO | 2009005767 | 1/2009 |
| WO | 2010092360 | 8/2010 |

OTHER PUBLICATIONS

U.S. Appl. No. 13/452,207, "Non-Final Office Action", Feb. 14, 2014, 6 pages.
U.S. Appl. No. 13/464,997, "Non-Final Office Action", Sep. 12, 2013, 11 pages.
U.S. Appl. No. 13/464,997, "Response to Non-Final Office Action", Jan. 13, 2014, 22 pages.
U.S. Appl. No. 13/464,997, "Response to Restriction Requirement", May 1, 2013, 6 pages.
U.S. Appl. No. 13/464,997, "Restriction Requirement", Apr. 5, 2013, 13 pages.
U.S. Appl. No. 61/079,185, "Continuous Monitoring, Measuring and Controlling the Properties of Artificial Casings with Special Reference to Cellulose and Fibrous Casings", filed Mar. 2009.
U.S. Appl. No. 61/182,696, "Printing of Data, Logos and Coded or Uncoded Information on Wet Surfaces and High Moisture Content, Natural, Unprocessed and Processed Foodstuffs.", filed May 2009.
U.S. Appl. No. 61/182,731, "Continuous Monitoring, Measuring and Controlling the Properties of Webs, Films and Tubular Casings with Special Reference to Cellulose and Fibrous Casings", filed May 2010.
U.S. Appl. No. 61/478,190, "Adaptive Packaging for Food Processing Systems", filed Apr. 22, 2011.
U.S. Appl. No. 61/478,491, "Apparatus and Method for Optimizing and Controlling food processing performance especially in continuous sterilizing or pasteurizing systems", filed Apr. 23, 2011.
U.S. Appl. No. 61/478,665, "Accelerating, Optimizing and Controlling product cooling in food processing systems especially continuous sterilizing or pasteurizing systems", filed Apr. 25, 2011.
U.S. Appl. No. 61/480,521, "Novel Continuous and Flexible food and drink processing technology", filed Apr. 29, 2011.
U.S. Appl. No. 61/483,923, "Method and Apparatus for Enhanced Performance of a Conventional Continuous Sterilizing System", filed May 9, 2011.
U.S. Appl. No. 61/488,220, "Enhanced Product Capacity, Quality and Handling Flexibility Within a Conventional Continuous Food Processing System", filed May 20, 2011.
U.S. Appl. No. 61/540,010, "Novel Thermal Transfer Media for Processing of Food and Drink Products", filed Sep. 28, 2011.
Ball, "Foundation of Food Process Calculation Methods", Sterilization in Food Technology, 1992, pp. 124-125.

(56) References Cited

OTHER PUBLICATIONS

Ball et al., "Heating Curve-Simple Logarithmic Temperature Rise", Sterilization in Food Technology, Theory, Practice and Calculations, 12:313-329.

Berlinet et al., "Effect of Pulp Redaction and Pasteurization on the Release of Aroma Compounds in Industrial Orange Juice", J. Food Sci., vol. 72, No. 8, Oct. 2007, pp. 5535-5543.

Best, "Physical Parameters of Cooling in Cryonics".

Bichier et al., "Thermal Processing of Canned Foods Under Mecheanical Agitation", Asme Heat Transfer Div Publ HTD; American Society of Mechanical Engineers, Heat Transfer in Food Processing, Abstract, 1993.

Browning et al., "Selecting and Maintaining Glycol Based Heat Transfer Fluids", Facilities Engineering Journal, Sep. 2010, pp. 16-18.

Casolari, Food Microbiology, 1994, vol. 11, pp. 75-84.

Chang et al., "Modeling Heat Transfer During Oven Roasting of Unstuffed Turkeys", Journal of Food Science, 1998, 63(2):257-261.

Chang et al., "Heat Transfer and Simulated Sterilization of Particulate Solids in a Continously Flowing System", J. Food Sci., 1989, vol. 54(4):1017-1023 & 1030.

Chen et al., "Modeling Coupled Heat and Mass Transfer for Convection Cooking of Chicken Patties", Journal of Food Engineering, 1999, 42:139-146.

Clausing, "Numerical Methods in Heat Transfer", Lectures on Advanced Heat Transfer, 1989, 157-181.

Conway et al., "Commercial Portion-Controlled Foods in Research Studies: How Accurate are Label Weights", Journal of the American Dietetic Association, vol. 104, No. 9, Sep. 2004.

Datta et al., "Computer-Based Retort Control Logic for On-Line Correction of Process Deviations", J. Food Sci., 1986, 51(2):480-483 & 507.

Denys et al., "Evaluation of Process Deviations, Consisting of Drops in Rotational Speed, During Thermal Processing of Foods in Rotary Water Cascading Retorts", J. Food Eng., 1996, 30:327-338.

Dias et al., "Anhydrous Bioethanol Production Using Bioglycerol: Simulaiton of Extractive Distillation Process", European Symposium on Computer-Aided Process Engineering, 2009, 519-524.

Downing et al., "Canning of Marine Products", A Complete Course in Canning and Related Processes, 1996, Book III; 312-322.

EP12164764.8, "European Search Report", Aug. 16, 2012, 11 pages.
EP12164764.8, "Office Action", Oct. 8, 2013, 5 pages.
EP12164764.8, "Response to European Search Report", Apr. 22, 2013, 42 pages.
EP12164764.8, "Response to Office Action", Feb. 10, 2014, 38 pages.
EP12164859.6, "European Search Report", Aug. 21, 2012, 5 pages.
EP12164859.6, "Office Action", Jul. 19, 2013, 3 pages.
EP12164859.6, "Response to European Search Report", Apr. 22, 2013, 30 pages.
EP12164859.6, "Response to Office Action", Nov. 7, 2013, 48 pages.
EP12165126.9, "Communication Pursuant to Rule 71(3)", Jan. 9, 2014, 31 pages.
EP12165126.9, "European Search Report", Jul. 23, 2012, 8 pages.
EP12165126.9, "Office Action", Aug. 2, 2013, 4 pages.
EP12165126.9, "Response to European Search Report", Jun. 19, 2013, 33 pages.
EP12165126.9, "Response to Office Action", Dec. 9, 2013, 50 pages.
EP12165959.3, "European Search Report", Jul. 24, 2012, 6 pages.
EP12165959.3, "Response to European Search Report", Apr. 26, 2013, 39 pages.
EP12167138.2, "Decision to Grant", Dec. 12, 2013, 2 pages.
EP12167138.2, "European Search Report", Aug. 17, 2012, 6 pages.
EP12167138.2, "Response to European Search Report", May 14, 2013, 49 pages.
EP12168270.2, "European Search Report", Sep. 19, 2012, 4 pages.
EP12168270.2, "Response to European Search Report", May 21, 2013, 63 pages.
EP12186224.7, "Communication Under Rule 71(3)", Dec. 19, 2013, 29 pages.
EP12186224.7, "European Search Report", Dec. 20, 2012, 6 pages.
EP12186224.7, "Response to European Search Report", Oct. 1, 2013, 34 pages.

Erdogdu et al., "Modeling of Heat Conduction in Elliptical Cross Section: 1 Development and Testing of the Model", Journal of Food Eng., 1998, vol. 38, 223-239.

Fahloul et al., "Measurements and Predictive Modelling of Heat Fluxes in Continuous Baking Ovens", Journal of Food Engineering, 1995, 26:469-479.

Fastag et al., "Variable Control of a Batch Retort and Process Simulation for Optimization Studies", J. of Food Proces Engg., Nov. 1996, 19:1-14.

Fellows, "Food Processing Technology: Principles and Practice, Chapter 12: Heat Sterilisation", second edition, 2000, 262.

Giannoni-Succar et al., "Correction Factor of Deviant Thermal Processes Applied to Packaged Heat Conduction Food", J. Food Sci, 1982, 47(2):642-646.

Gill et al., "Simulation of Ethanol Extractive Distilation with a Glycols Mixture as Entrainer", 2nd Mercosur Congress on Chemical Engineering, 2005.

Gill et al., "Computerized Control Strategies for a Steam Retort", Journal of Food Engineering, 1989, vol. 10 135-154.

Glycerine NPL, "http://www.engineeringtoolbox.com/glycerine-boiling-freezing-points-d_1590.html, 2011".

Hayakawa et al., "Estimating Heat Processes in Canned Foods", Ashrae Journal, Sep. 1975, 36-37.

http://www.artisanind.com/ps/equ, "The Artisan Rototherm", Artisan Industries Inc., Available at least as early as May 8, 2012.

http://www.sciencemadness.org/ta, "(comments by Sauron on pp. 4-5)", Jan. 19, 2007.

Huang et al., "Meatball Cooking-Modeling and Simulation", Journal of Food Engineering, 1995, 24:87-100.

Jiang et al., "Desilication from Illite by Thermochemical Activation", Oct. 2004, vol. 14, No. 5, 1000-1005.

Lanoiselle et al., "Predicting Internal Temperature of Canned Foods During Thermal Processing Using a Linear Recursive Model", J. Food Sci., 1995, 60(4):833-840.

Larkin et al., "Experimental Errors Associated with the Estimation of Thermal Diffusivity from Thermal Process Data", J. Food Sci, 1987, 52(2):419-428.

Liu, "Modelling of Thermal Properties of Food", Handbook of Food Science, Technology and Engineering, 2006, vol. 3 Chapter 110.

Manson, "Evaluating Complex Deviations-Hydrostatic Sterilizers", TechniCAL, Inc., Chapter 12:12-1-12.4.

Manson, "Evaluation of Lethality and Nutrient Retentions of Conduction-Heating Foods in Rectangular Containers", Food Technology, 1970, 24(11):109-113.

Martin et al., "Propylene Glycol Based Heat Transfer Fluids", http://www.engineeringtoolbox.com/propylene-glycol-d_363.html, 2011.

McConnell, "Effect of a Drop in Retort Temperature Upon the Lethality of Processes for Convection Heating Products", Food Tech., Feb. 1952, vol. 6, No. 2, 76-78.

Meng et al., "Heat Transfer to Canned Particulates in High-Viscosity Newtonian Fluids During Agitation Processing", J. Food Processing and Preservation, 2006, 30:643-658.

Morrison et al., "Glycerol", Dec. 4, 2000, 1-13.

Navankasattusas et al., "Monitoring and Controlling Thermal Processes by On-Line Measurement of Accomplished Lethality", Food Technology, Mar. 1978, 79-83.

Onita et al., "Estimation of the Specific Heat and Thermal Conductivity of Foods Only by Their Classes of Substances Contents (Water, Proteins, Fats, Carbohydrates, Fibers and Ash", Scientifical Researches. Agroalimentary Processes and Technologies,vol. 11, No. 1, 2005, pp. 217-222.

Porter et al., "Non-Newtonian Viscosity of Polymers", J. Appl. Phys., 1961, vol. 32, No. 11, 2326.

Press et al., "Parabolic Interpolation and Brent's Method in One Dimension", Numerical Recipes in Fortran, 395-398.

Rainbow et al., "Effect of Chelating Agents on Accumulation of Cadmium by the Barnacle Semibalanus Balanoides and Complexation of Soluble Cadmium, Zinc and Copper", Marine Ecology 2, 1980, 143-152.

(56) References Cited

OTHER PUBLICATIONS

Sahin et al., "The Thermal Properties of Food", Springer Science, Physical Properties of Food, 2006, 107-155.
Simpson et al., "Computer Control of Batch Retort Process Operations", Food Processing Automation, Conference (Proceedings), May 1990.
Teixeira et al., "Computer Control of Batch Retort Operations with On-Line Correction of Process Deviations", Food Technology, Apr. 1982, 85-90.
Teixeira et al., "Computer Optimization of Nutrient Retention in the Thermal Processing of Conduction-Heated Foods", Food Technology, 1969, vol. 23(845):137-142.
Teixeira, "Innovative Heat Transfer Models: From Research Lab to On-Line Implementation", Food Processing Automation II, Proceedings of the 1992 FPEI Conference, May 4-6, 1992, 177-184.
Teixeira et al., "On-Line Retort Control in Thermal Sterilization of Canned Foods", Food Control, 1997, vol. 8 No. 1:13-20.
Thin-Film Drying, LCI Corporation, Available at least as early as May 8, 2012.
Wang et al., "A Mathematical Model of Simultaneous Heat and Moisture Transfer During Drying of Potato", Journal of Food Engineering, 1995, 24:47-60.
Weng et al., "Process Deviation Analysis of Conduction-Heating Canned Foods Processed in a Hydrostatic Sterilizer Using a Mathematical Model", Journal Food Processing Automation IV, 1995, vol. 41(6):368-379.
Weng et al., "The Use of a Time-Temperature-Integrator in Conjunction with Mathematical Modelling for Determining Liquid/Particle Heat Transfer Coefficients", J. Food Engg., 1992, 16:197-214.
Williams, "Modular Sterilization Processing", Allpax Products, Inc.
www.lytron.com/tools-and-technic, "The Best Heat Transfer Fluids for Liquid Cooling", Jul. 14, 2011.
Young et al., "Product Temperature Prediction in Hydrostatic Retorts", Transactions of the ASAE, 1983, vol. 26(1):316-320.
Young et al., "Predicting Product Lethality in Hydrostatic Retorts", Journal of Food Science, 1985, vol. 50:1467-1472.
Zhao et al., "Computer Simulation on Onboard Chilling and Freezing of Albacore Tuna", Journal of Food Science, 1998, vol. 63(5):751-755.
Final Office Action, U.S. Appl. No. 13/464,997, mailed May 23, 2014.
Response to Non-Final Office Action, U.S. Appl. No. 13/452,207, filed Jun. 5, 2014.
Decision to Grant, European Patent Application No. 12186224.7, mailed Mar. 27, 2014.

* cited by examiner

SAFE AND EFFICIENT THERMAL TRANSFER MEDIA FOR PROCESSING OF FOOD AND DRINK PRODUCTS

PRIORITY

This application claims benefits from the priority of Provisional Patent Application No. 61/540,010 filed 28 Sep. 2011

REFERENCES CITED

| U.S. Patents | | |
| --- | --- | --- |
| U.S. Pat. No. 5,484,547 | January 1994 | Mendoza |
| USPA 20030211212 | November 2003 | Belongia et al |
| USPA 20050040251 | February 2005 | Daly |
| USPA 20060038159 | February 2006 | Fukutani et al |
| USPA 20060051639 | March 2006 | Yang et al |
| USPA 20070122335 | May 2007 | Hwang |
| USPA 20070275178 | November 2007 | Nishi et al |
| USPA 20080315152 | December 2008 | Daly |
| USPA 20090057607 | March 2009 | Evans & Light |
| USPA 61/478,190 | April 2011 | Newman |
| USPA 61/478,491 | April 2011 | Newman |
| USPA 61/478,665 | April 2011 | Newman |
| USPA 61/480,521 | April 2011 | Newman |
| USPA 61/483,923 | May 2011 | Newman |
| USPA 61/488,220 | May 2011 | Newman |
| USPA 20110104350 | May 2011 | Clusserath & Bruch |

| Foreign Patents | | |
| --- | --- | --- |
| GB2010/000268 | February 2010 | Purakkat & Jassal |

OTHER REFERENCES

Heat Transfer to Canned Particulates in High Viscosity Newtonian Fluids during agitation processing,
Meng, Y and Ramaswamy, H.; J. Food Processing and Preservation, 30, 643-658 (2006)
Propylene Glycol based Heat Transfer Fluids, Engineering Toolbox.com (2011)
Glycols and Propylene Glycols, Martin, A and Murphy, F, Volume 12, Publication 117-01785-0306, (1994)
Selecting and Maintaining Glycol based Heat Transfer Fluids,
Browning, A and Berry, D.; Facilities Engineering Journal, 16-18, September/October 2010
Best Heat Transfer Fluids for Liquid Cooling, Technical Reference Notes, 3 pp
Lytron Thermal Solutions (2011)

FIELD OF INVENTION

The present invention relates to the design and development of a unique family of novel, safe and efficient thermal processing and transfer media, for use in all aspects of effective, optimized food and drink processing, which are essentially free of water and have to be kept so for optimum performance, do not change state at any point during processing which may include heating, holding or cooling stages in any combination, remain essentially corrosion-free throughout their useable life and are composed solely of products and compounds deemed safe to directly or indirectly contact food.

It further relates to using different compositions of the thermal processing media for each heating, holding and cooling stage and the capability of modifying those composition to optimize the thermal conductivity properties of the foodstuff being processed and/or the foodstuff packaging materials being processed essentially with minimal need for additional system pressurization and without the need for steam.

It also relates to a capability of modifying the composition of and utilizing any additional system pressure to modify the composition of gases within the food container at specific points within the processing cycle.

Finally it relates to the development of applications that, in combination with novel but flexible processing apparatus and methodologies, permit any type of food and drink processing that requires any combination of heating and/or holding and/or cooling, to be undertaken within the same equipment configurations using these novel thermal transfer mixtures.

BACKGROUND TO INVENTION

To achieve acceptable shelf-life, food and drink products require some degree of primarily physical but occasionally chemical processing. This creates a number of issues. Firstly, anything that delays the delivery of the foodstuff from source to destination is a cost.

Secondly, food and drink raw materials and products are highly susceptible to both microbial contamination and/or organoleptic deterioration. The longer the delay between product manufacture and arrival at the end-user, the greater the amount of spoilage and degree of deterioration. This, in turn, increases the amount of processing needed to minimize spoilage and/or loss. This, in turn, generates the need for more energy and more cost.

And finally, the longer the timescale between arriving at the end user and its ultimate consumption, the more the foodstuff requires additional energy consumption in the form of cooking and cooling or refrigeration or preservation.

Escalating processing costs, and particularly energy costs, in the form of cooking/cooling, refrigeration, or storage and distribution, are becoming a very major issue with many food and drink products. So much so that we often find that the container holding the food product costs more than the food product itself and the energy costs in producing and holding the food within the container in a safe and wholesome manner, cost more than the combined costs of the food and its container.

So, methods of preserving food without incurring large energy consumption during processing and/or consuming energy during storage, coupled with other cost reductions, are receiving increasing attention.

It is well-known that methods of extending shelf-life, such as smoking and cooking for foodstuffs and water cooling for liquids have been known for thousands of years, long before the role of spoilage and pathogenic micro-organisms was known or the role of chemical oxidation identified.

There are four primary types of food treatment for the purpose of extending shelf-life and minimizing pathogenicity, namely preservation, stabilization, pasteurization and sterilization. Each of these entails a different ratio of the amount of heating and cooling being applied with the more heating involved the less the amount of refrigeration required. Preservation, in the form of refrigeration, imparts no heating into the process and maintains many foods at their highest quality but with minimal shelf-life. However, if the degree of refrigeration is increased, e.g. freezing, the shelf-life increases but quality attributes tend to decrease.

While there are a wide range of factors involved in deciding which processing methods is most suitable for each application, including the amount of shelf-life required, the availability of refrigeration before and after processing, the robustness of the foodstuff raw materials or finished products, the prevalence of spoilage and/or pathogenic organisms, and the value of the raw materials and/or finished products, it is the absolute costs and the cost to value ratio that play a major role in the decision-making of the chosen preservation method.

Despite the extensive selection of methods available, (summarized in Newman, U.S. PA 61/480,521), one method, that involving the heating and cooling of the foodstuff using a thermal processing medium usually air, water or steam, is by far the most prevalent whether domestic or industrial in nature. Again, this approach is also found in many different variants such as the use of dry or wet heat, continuous or batch, static or moving, aseptic or non-aseptic environments, etc.

Continuous sterilization has been commercially available for almost 50 years and is the process of choice for manufacturers of large volume monoculture production, i.e. high throughput of the same products such as beans, soups and ketchup. While such systems involve major capital expenditure at the outset, over time it becomes increasingly cost effective. It allows very large volumes of product, often in excess of 400 units per minute to be continuously processed.

However, it was originally designed at a time when availability of refrigeration in the domestic environment was low and the demand for cost-effective production was high. It was also designed in an era where energy costs where comparatively low and freely available. So, in the modern processing environment, it has several limiting factors.

The initial capital costs are high, the running costs, especially energy costs, are also high. The considerable system infrastructure needed to withstand the high temperatures and pressures also absorbs a large percentage of the available energy. It is relative inflexible as it requires considerable equilibration time for a product changeover. It also has little buffering capacity so product has to completely exit from one chamber/tower before system changes can be enacted. In practice, the only parameter within the continuous sterilization environment that can be easily adjusted is speed of throughput/dwell time.

While there have been a continuous stream of incremental improvements to the established, continuous sterilization technologies (as typified by the teachings of Ono, U.S. Pat. No. 7,008,659 and Perren, U.S. patent application Ser. No. 12/648,067), Newman teaches novel methods, applications and apparatus for enhancing and optimizing process performance (U.S. PA 61/483,923), significantly improved system process control (U.S. PA 61/478,491), increased flexibility in the use of modern, lower cost packaging materials (U.S. PA 61/478,190) and enhanced finished product organoleptic properties, through improvements in enhanced product cooling (U.S. Pat. No. 478,665). He also teaches a novel method and apparatus for enhanced, controlled continuous sterilized food and drink manufacturing using apparatus that significantly reduces capital equipment costs while greatly improving manufacturing flexibility, (U.S. PA 61/480,521). Most recently (U.S. PA 61/488,220), he teaches a method which incorporates all of the above mentioned enhancements into the original vertical process but removes significant amounts of processing cost from the continuous pasteurization and sterilization by largely eliminating the need for system pressurization, (All of these applications are hereinafter incorporated by reference).

These major improvements, previously detailed by Newman, have concentrated on optimizing the use of energy while reducing overall unit costs while, for the most part, using technology incorporating many of the original system fundamentals. But, by controlling system performance and system efficiency, both the quality and value of the products produced has significantly improved, resulting in an integrated system where cost benefit and product quality potentially outweigh the performance of competing technologies specifically designed for methods of preservation other than sterilization, particularly pasteurization and stabilization.

However, one major obstacle remains, namely, how to optimize and control the physical and chemical properties and performance of the thermal transfer medium when faced with a range of products with different compositions and therefore differing thermal transfer properties.

As previously detailed elsewhere, the use of water as a thermal transfer medium for food and drink product production is extremely inefficient. During any heating phase, it has a thermal transfer rate at least two times faster than needed for producing the best quality food products. As a consequence, a lot of the energy is wasted and too much is consumed by the outer layers of containerized product, resulting in significant over-processing, made worse by any change of state from water to steam. Similar but somewhat less, energy inefficient properties are exhibited during any elevated temperature holding phase, while during cooling phases, water has a relatively small temperature window before it changes state from liquid to solid and becomes extremely abrasive on mechanical systems. Therefore its capability as a cooling agent is physically limiting and process inefficient.

The conundrum for the food manufacturer is an absolute requirement for the production of pathogenically-safe food. However, in doing so, the severe processing conditions cause significant deterioration in food quality attributes. The poorer the food quality attributes, the lower the value of the product. Therefore, there is equally a need for minimal structural disruption in order to maintain the highest product quality.

To achieve sterilization, food has to reach and maintain temperatures of 121° C. for some 5-35 minutes, depending on product type, product composition, container and volume. Higher temperatures and pressures will require less exposure time. Because of very severe limitations on the type and number of chemicals that can directly or indirectly contact food, as well as cost and availability, water has been the primary 'thermal processing medium of choice'. To achieve sterilization temperatures using water as the thermal transfer medium, requires both a change of state (steam) and a change of pressure (pressurized to 2 atmospheres). Not only does this require a significant amount of energy, in changing from a liquid to its gaseous state, i.e. steam, its thermal conductivity also changes (from 0.58 to 0.016). With most food components (except water and ash) having a thermal conductivity in the range 0.22-0.38 this further exacerbates the issues related to controlled thermal transfer and resultant over-processing, excessive structural breakdown and uneven processing of food and drink products. This makes the use of water as the thermal processing medium costly to structural incorporate and to use and difficult to control in terms of total energy and energy distribution.

It is also extremely corrosive to system structures, especially any equipment or support structures that are constructed of metal and/or concrete with steam being more corrosive than water. It requires considerable extra cost expenditure to minimize these corrosive properties.

While modification, optimization and control of process, product, product container and system performance have all been shown to have positive cost and quality benefits to thermally processed food and drink products, the major cost and performance constraints are the consequence of the thermal capabilities of the processing medium. For a wide range of reasons, there is an obvious and pressing need to find a suitable replacement thermal processing medium for water and steam.

Ideally, this thermal processing medium should be capable of optimized heating, holding and cooling performance without any change of state. Its thermal conductivity also needs to encompass the thermal conductivity of the major components of food and drink products. It also needs to be energy efficient, cost effective, minimally corrosive and safe in use.

While there are many liquids or mixtures that could be used to achieve one or more of these properties, extensive regulatory requirements severely limits which compounds can be used, most particularly in food application uses.

In recent times, there has been considerable advances in the types of thermal transfer media that can be used in cooling applications for buildings, engines, anti-freezes, windscreen washing fluids and the like. Many refrigerant systems use various glycol mixtures or glycol/alcohol mixtures (c.f. U.S. Pat. No. 5,141,662 and USPA 20080048147). These mixtures have found considerable use in such applications because, unlike water they remain in a liquid state when external or operating temperatures fall below 0° C. They have also been suggested as a suitable refrigerant in a wide range of other applications as diverse as solar powered refrigerators (U.S. Pat. No. 7,543,455) and in the cooling of electronic components (USPA 20070122335).

However, all these refrigerant/coolant media still contain significant amounts of water (30%-50% v/v or w/v). As a consequence, they will be ionic in nature and still generate considerable corrosion to metal components, particularly the system's physical structures. As such they need the addition of anti-corrosion compounds to allow them to function as coolants and antifreezes. Eventually, as the temperature falls, some of the water component will form solid ice.

Whereas prior art in the development of thermal processing media has tended to concentrate on cooling applications, more recently there has been a significant increase in the development and application of novel thermal processing heating and holding applications such as solar heating, solar power and geothermal pumps. In such applications, the higher the temperature of the thermal processing media can run, the more efficient and effective the system will perform. As such systems are usually indirect forms of heat exchange, any effective and suitable thermal processing mixture can be used. In such applications, mixtures of glycols have been particularly successful, not only because of their elevated boiling points but also, because of their depressed freezing point capability, to function in climates where there are large temperature differences without any change of state. Once again, such mixtures are ionic and polar in nature and therefore can be extremely corrosive to mechanical parts and constructional components, especially at elevated temperatures.

Whereas most thermal transfer fluids and mixtures have been developed to optimize thermal conductivity, for example, by using carbon nano-capsules to improve the heat dissipation of liquids (USPA 20070122335), it has been suggested (USPA 2006/0051639) that for optimum performance of fuel cells, such equipment needs to maintain elevated temperatures so the thermal transfer fluids used with such systems need to function in a completely different way with high heat capacity but very low thermal conductivity.

Unfortunately, virtually all such compounds and mixtures, as described in the aforesaid application examples, cannot be used in the thermal processing of food applications as they contain components proven to be harmful to humans and animals, even when present in minute quantities.

It is well-known that the number of components approved to directly contact food is both highly regulated and very limited in number. In generally, they tend to be limited to components that are edible in their own right or naturally form part of processed product formulations, such as oils, fats and various water-based mixtures. Alternative fluids also include gas (USPA 2003/0211212) and air. The thermal processing properties of such mixtures usually limit their application to one element of the process. For example, cooking in hot fat and oils is well known. This is usually to ensure the outer surfaces or layers of the treated product are subjected to considerably more heat than the internal layers, e.g. batter coat fish and poultry portions. However, such thermal transfer media cannot be used for product cooling because of poor thermal transfer properties at depressed temperatures such as excessive viscosity or change of state from liquid to solid. Air and gas mixtures are well-known in oven-cooking operations. They are much less energy transfer efficient than liquids in either heating or cooling but they can be temperature better controlled and thus makes them more suitable for food processing applications which require accurate temperature holding for a period of time, e.g. baking of pastries, breads and doughs.

However, most food applications require thermal transfer media with optimized heat transfer properties both during the heating and cooling cycles—one such component is food grade Glycerol (Glycerin)

Glycerin had historically been used as an automobile antifreeze but was later replaced by more efficient and cheaper glycol mixtures. More recently, with the main source of glycerin/glycerol coming from the manufacture of bio-diesel from renewable resources and from sources other than petroleum, resulting in a much lower supply cost than previously, there has been renewed interest in the use of glycerin/water and glycerin/alcohol/water mixtures as refrigerants (e.g. USPA 20080315152). The use of glycerin as an excellent heating medium has been known for over 2 centuries. It was used to heat absinthe stills in the $19^{th}$ century so that local overheating from a direct heating source such as a wood or coal fire, would not char the herbs, (Sauron, 2007). It has a high boiling point of 290° C. and a flash point of 176° C. Although generally safe, it does produce Arcolein when decomposed by excessive heat.

Most raw glycerin produced today is a byproduct of biofuel manufacturing, has a typical concentration of 60-82% glycerin but also contains numerous contaminants and other byproducts including glycols, alcohols, particularly methanol and ethanol, various organic and inorganic compounds, fatty acids and water. Unfortunately such compounds, particularly glycols and methanol, are toxic in nature and are not allowed to directly contact foodstuffs, although potentially they could be used as an indirect cooling medium.

In most applications, the use of glycerin/glycerol as a cooling medium is impractical because of increasing viscosity as it cools. Newman (U.S. PA 61/480,521) teaches methods and apparatus that will allow suitable glycerin only or glycerin/minimal water mixtures to function as an effective and efficient coolant, be composed only of GRAS approved components and without the need for anti-corrosion additives, they avoid any constraints in their application or use. Newman further teaches (U.S. PA 61/483,923) how such glycerin based formulations can also be optimally used in conventional hydrostat pasteurization and sterilization technology as well as in novel processing applications in which elevated temperatures are required but as there is no change of state during the heating phase, there is minimal need for pressurization and capital equipment costs are significantly reduced.

However, we have surprisingly found that the thermal transfer properties of such media can be significantly improved if mixed preferentially with other compounds which themselves are GRAS or better approved but have differing transfer properties to glycerol/glycerin mixtures alone in a manner that allows manufacturers to optimize the properties of the thermal transfer medium relative to the thermal transfer properties of the product undergoing processing while maintaining both a single physical state throughout all stages of processing and remain essentially non-corrosive.

We have therefore developed a totally different and novel range of thermal transfer media, which not only addresses all of the constraints, limitations and drawbacks of existing water/steam, based sterilization systems. We have also been able to develop the applications and methodologies to better optimize thermal processing but particularly address energy usage and usage costs.

While these media have been specifically designed for food and drink product manufacture and processing, it will be obvious to those skilled in the art that such controllable thermal transfer media will have application well beyond food and drink manufacturing.

SUMMARY OF INVENTION

It is an object of the present invention to optimize the thermal processing of foodstuffs.

It is another object of the present invention to optimize the thermal processing of foodstuffs through modification of the chemical composition of the thermal transfer medium during each processing stage.

It is a further object of the present invention to achieve such optimization without a change of state of the thermal transfer medium.

It is a still further object of the invention to achieve such optimized thermal processing using media that are neither water nor steam.

It is another object of the invention, that the thermal transfer media are essentially composed of non-ionic liquids.

It is still yet another object of the invention that the modification to the chemical composition of thermal transfer media results in thermal conductivity and thermal diffusivity optimized for any combination of foodstuff and foodstuff container.

It is a further object of the invention to achieve such optimized thermal processing using only media classified as safe and approved to directly contact food product and/or food product containers.

It is yet a further object of the current invention to achieve any type of foodstuff thermal processing without the use of anti-corrosion additives in the thermal transfer media.

It is another object of the current invention to maintain the thermal transfer media in a non- or minimally corrosive state through a methodology that prevents the ingress of air/oxygen, the absorption of moisture or the formation of metal ions.

It is yet a further object of the invention to achieve the optimized thermal processing techniques to both continuous and discontinuous processing systems using the modified thermal transfer media.

It is a further object of the invention that using such thermal processing media allows any heating, holding or cooling stage can be processed within the same equipment configurations essentially with no/minimal need for additional pressurization, the use of unheated modified atmospheres, in conjunction with these novel media, can be used to change or control the atmospheres within containers, especially polymer based containers, at specific locations within the processing cycle.

It is another object of the invention that the processing conditions within the apparatus containing the optimized thermal processing media can be independently adjusted so as to handle any type of product and container combination simultaneously while rendering the foodstuffs to a state of enzymatic inactivation and/or stabilization and/or pasteurization and/or sterilization.

It is a final object of the invention that the method and apparatus thermally processing the foodstuffs to a state of enzyme inactivation and/or stabilization and/or pasteurization and/or sterilization be capable of independently optimizing, maintaining and controlling the composition of the thermal transfer media for each processing stage.

BRIEF DESCRIPTION OF DRAWINGS

There are NO drawings included in this patent application.

DETAILED DESCRIPTION OF THE INVENTION AND PREFERRED EMBODIMENTS

We will now describe, in more detail, the current invention and any preferred embodiments of the present invention with reference, as necessary, to any accompanying drawings. It will be obvious to anyone skilled in the art that the current invention and its preferred embodiments can be used in many different configurations, combinations and variants. As a consequence, the description given of the invention and any preferred embodiments described and examples given are merely to illustrate the potential range and scope of the current invention and not, in any way, to limit it.

We will first describe some of the thermal transfer media used in place of water and steam to achieve the necessary processing temperatures as well as optimized thermal transfer profiles.

Water has been the preferred thermal transfer medium for product pasteurizing and sterilizing for many centuries. Its relatively low cost, abundance and safety has made it the 'medium of choice' for most applications. However, it has many drawbacks including high thermal transfer rates, the necessity to change state to attain the elevated temperatures needed for sterilization, its corrosive nature and its ability to initiate oxidation and auto-oxidation reactions in both the foodstuffs being processed and the systems in which the processing stages are being undertaken.

We have previously described (Newman, U.S. PA 61/480, 521) how we surprisingly found that glycerol (also known as glycerin when its composition is 90% pure glycerol or less) can, not only substitute for water and/or steam in most applications, it can do so with significantly improved physical properties and financial benefits. (These improvements are described in detail in Newman, U.S. PA 61/480,521).

The use of glycerin as a heat transfer fluid has been proposed by Daly (USPA 2008/0315152 and USPA/2005/0040251). However, the formulations detailed indicate that they contain methanol, as well as a range of ionic inorganic salts and, as they contain at least 40% v/v water, they have measurable corrosion. Accordingly, such mixtures, while eminently suitable for building heating and cooling and as an engine coolant, cannot be used for food processing applications.

Similarly, Evans and Light (USPA 2009/0057607) teach a heat transfer fluid and anti-freeze that is 'lower toxicity' than conventional mixtures. They use a mixture of ethylene glycol and propylene glycol or glycerol and ethylene glycol together with water in the ratio of minimum 40% and maximum 60%—so that water is usually the major component. Accordingly, the thermal transfer formulation described is specifically for use in the cooling of the internal combustion engine. Once again, the inclusion of not only ethylene glycol but also the suggested inclusion of chemicals such as borate, bergo triazole and/or triethanolamine also precludes their use in any food or drink processing applications.

The anti-freeze mixture proposed by Fukutani (USDA 2006/0038159) specifically precludes the inclusion of ethylene glycol. However, again, although it advocates the addition of propylene glycol, it also includes water as a major component, especially in 'solution B'. Neither does it disclose the composition of the glycerin, which by convention can be a minimum of 10% water and a maximum of 99% water. It also contains a variety of compounds for use as inhibitors, descalers, chelating agents and other anti-freezing agents, none of which are approved for food use or human consumption. It is also specifically defined for use as an anti-freeze solution and further teaches that the anti-freeze solution is added to the heating medium of an internal combustion engine, i.e. water to prevent freezing. It not used as a heating medium.

The thermal transfer fluid of Yang (USPA 2006/0051639) designed primarily for thermal energy in alternative power sources such as fuel cells. It is not designed for food applications, as virtually all the possible components of the mixture are not approved for food contact. Similarly, the heat transfer fluid described by Purakkat and Jassal in Patent Application GB2010/000268 for use in their geothermal heat pump and solar panel applications although containing glycerin and water as primary components still contains significant amounts of non-food approved use constituents.

In combination with indirect heat exchangers, such as those typically used in the pasteurization, (a typical example being described by Clusserath, USPA 2011/01042350), such fluids could be used for indirect contact thermal transfer. However, because of the dissipation of heating and/or cooling energy, it will be extremely inefficient, only of practical use with the thermal processing of liquids, incapable of reaching, holding and maintaining sterilization temperatures and impractical for the processing of packaged products. Hsu et al (U.S. Pat. No. 6,086,782) use a similar approach with their thermal transfer fluid specifically designed for very low temperature thermal transfer applications. Dexheimer et al (U.S. Pat. No. 5,141,662) describe polyol-based thermal transfer fluids which have good thermal transfer properties but are stable for use in high temperature thermal applications such as in solder fluids and metal tempering and quenching baths.

As can be seen from the descriptions of previous teachings, with the exception of the various teachings of Newman, none of these mixtures and formulations can be used for direct contact processing of foods, the majority have significant water content but of primary importance, none of the prior mixtures can be modified or adapted to be optimized around the thermal capacity of the foodstuff or the foodstuff within its container for heating, holding and cooling.

We will now describe how we have developed novel solutions capable of thermally processing materials, with especial reference to food and drink products, how we manage and maintain such mixture compositions and how we can achieve thermal processing at optimal performance and cost while only working with mixtures comprised of components, determine and classified as GRAS or better status.

We had previously discovered that a glycerol/water mixture of 66%:34% is optimum for cooling capacity, freezing at −47° C. However, such a mixture only has a boiling point of 110° C. which is insufficient for sterilization requirements whereas a glycerol/water mixture of 85%:15% has a boiling point of 127.5° C., ideal for sterilization but its freezing point is only around −10° C. so its cooling capacity while better than water, is much less than the optimum glycerol/water mixture for cooling.

Additionally, we found that we had to compromise in defining the optimum thermal transfer medium composition. The thermal conductivity for the optimum heating media was 0.32 W/m2/° C. while that for the optimum cooling media was 0.40 W/m2/° C. We also found that over time, particularly in high humidity manufacturing environments, the thermal media absorbed moisture, which slowly increased the rate of thermal conductivity shifting it, further away from its optimum.

We have surprisingly found that we can achieve the necessary optima for both heating and cooling by monitoring, measuring and controlling the rate at which atmospheric moisture is allowed to be mixed with the glycerol, a finding we incorporate as an embodiment. At elevated temperatures, glycerol has a very low viscosity, which makes it eminently suitable as a thermal transfer medium for both heating and holding stages in food processing manufacture.

We have further found that as the glycerol:water ratio decreases; the rate at which further moisture is absorbed slows as the viscosity increases. Therefore we have found it easier to maintain the cooling properties of the glycerol near its optimum efficiency.

While others have described the use of glycerol/water mixtures (usually in crude mixtures derived from bio-fuel production and/or in combination with other components) in industrial heating, solar heating, anti-freeze and other similar applications, we have identified its capabilities in all stages of food and drink processing. More especially, we have demonstrated its capability to thermal process foods to sterilization temperatures without any change of state.

We have further shown that, providing the composition of the thermal processing medium is at a level of purity that satisfies GRAS (or equivalent) quality standards, it can process food components directly, without the need for any container, flexible or inflexible, to act as a boundary between the thermal processing medium and the foodstuff.

It is well-known to those skilled in the art that food or pharmaceutical grade glycerol is used as a humectant in a wide-range of foods, cosmetics, soaps and pharmaceuticals. It is therefore essential to be able to control both the amount of water and its rate of absorption so as to maximize the properties, efficiency and durability of the thermal processing medium.

We have also surprisingly found that we can further control the absorption of water in glycerol through the addition of other non-ionic components that possess the same GRAS status requirements. More especially we have found that Propylene Glycol and Polypropylene Glycol (more specifically, DiPropylene Glycol and Tripropylene Glycol) are the most effective and we incorporate these findings as embodiments to the invention.

We have further found that we can replace the glycerol component with any of these Propylene Glycols without significant change to the physical properties of the thermal processing medium. Furthermore we have surprisingly found that we can replace any of the components, i.e. Glycerol, Propylene Glycol or any individual or mixture of Polypropylene Glycols in any proportion up to 100%. However, the longer the repeating propylene chain in any of the Polypropylenes, the more they affect the freezing point of the mixture, i.e. replacing 100% of the propylene glycol component with 100% of the tripropylene glycol in a thermal processing mixture containing 60% glycerol and 40% glycols will cause the freezing point of the mixture to rise from −42° C. to −31° C. We have further found that when the thermal processing medium is used as a 'reservoir of refrigeration' (as taught in Newman, U.S. PA 61/478,665), this fall in potential refrigeration capacity only has practical consequences when working close to the limits of total required process thermal cooling.

Newman (U.S. PA 61/478,665) also teaches that to maintain thermal transfer fluids, other than water or steam, in an essentially non-corrosive state, the thermal transfer medium needs to be kept free of solids, ionic, particularly cationic materials and this is essentially achieved using a combination of filtration to remove solid particles, zeolites to remove selective ionic materials and chelating agents to maintain an essentially non-ionic environment. However, all such media used must be approved as safe for use with direct contact with food processing operations.

We have found that such processes work equally well with the mixtures of Glycerol, Propylene Glycol or any individual or mixture of Polypropylene Glycols in any proportion. However, as an additional step, we have found that maintaining a moisture content of 40% or lower, and preferably 28% or lower, in the atmosphere surrounding the thermal processing medium, further reduces the absorption of water into the thermal processing medium, minimizing the dissociation of water to ionic components and further reducing the potential for formation of corrosive components. Any suitable process or component can be used for this purpose. However, from a cost performance perspective we have found that physical processes such as dehumidification or recyclable chemicals such as silica gels, work best.

All of the foregoing is incorporated herein as embodiments to the current invention.

One of the biggest problems encountered in the thermal processing of food is the mismatch between the thermal transfer properties of the thermal processing medium and the ability of the foodstuff or foodstuff container to transfer that energy (Thermal conductivity and Thermal diffusivity). Those skilled in the art are aware that water and/or steam and/or air are the thermal processing media of choice for the food processing industry. Unfortunately, as taught by Newman (U.S. PA 61/480,521) and others, water has a thermal transfer capability of around 0.6 W/m/° C., and therefore is ideal for beverages and juices with high water content. However most foodstuffs have thermal transfer maxima in the region of 0.2 W/m/° C. for fatty foods, 0.25-0.32 W/m/° C. for most processed foodstuffs, around 0.45 W/m/° C. for high moisture content foodstuffs, while low moisture foods, such as powders, flours and cereals, have low to very low thermal transfer properties, often less than 0.15 W/m/° C. This results in more energy being available at the food/thermal processing medium interface than can be conducted through the foodstuff. This, as a consequence, leads to significant over processing and variable processing which, in turn, results in poor quality and variable quality products of lower intrinsic value. Similarly, with the exception of metal cans and glass bottles and jars, most food containers have thermal conductivity values similar to those of food.

What is needed is a thermal processing medium, which has thermal transfer properties, which better suits the products to be processed. Newman (U.S. PA 61/480,521) teaches that a thermal transfer medium comprising essentially food grade glycerol with minimal water has a thermal conductivity of around 0.32-0.40 W/m/° C. and does not change state at any point during the thermal heating, holding or cooling processes. However, this is still above the thermal conductivity maxima for most foodstuffs and most polymer based food containers.

What we have further surprisingly found is that we can modify the conductivity of the thermal processing medium previously described herein by varying its composition. For example, Propylene Glycol has a thermal conductivity of 0.34 W/m/° C. while Tripropylene Glycol of between 0.158 to 0.206 depending on its concentration and water content (Dipropylene Glycol has thermal conductivity values intermediate with these two).

Because all of the compounds are non-ionic they are fully miscible. They also have similar viscosity, dielectric, specific heat, melting point, freezing point and boiling point properties, although if higher boiling points are required then increasing the proportions of polypropylenes relative to propylene glycol and/or glycerol will provide the required thermal properties.

Using this discovery, we have been able to produce thermal processing media, which are optimal for specific product and/or product container combinations. We have been able to demonstrate that product heating/holding and cooling closely follows theoretical calculated maxima, providing other constraining factors such as product loading and thermal load distribution (Newman, U.S. PA 61/478,190 and U.S. PA 61/480,521) have been similarly optimized. We have also been able to increase heating and cooling capacity using such thermal processing media, thus increasing the rate of product throughput and thus overall system cost performance.

As previously stated, the increased specific density of these thermal media mixtures allows all stages of the processing to be accomplished essentially without the need for additional system pressurization, e.g. using steam. However, where needed it does not need the formation of steam as in conventional continuous processing systems, it can merely be through the application of pressurized unheated air/gas.

What we have also surprisingly found is that we can use such pressurized gas to control, modify or change the atmosphere within the food product container, especially polymer based containers and more especially, polymer based containers of the type detailed by Newman in (U.S. PA 61/478,190)

But, most importantly, we have been able to better control the finished product properties so as to achieve the very highest achievable for any of the sterilization, pasteurization or stabilizing processed used and we hereby incorporate these findings as embodiments to the current invention.

We will now describe a simple example of how such inventions can be used within the food and drink processing environment. However, it should be noted that the example is used solely for illustrative purposes and is not meant to be limiting in any way. The potential for using such embodiments, both within food and drink processing operations and elsewhere, will be obvious to those skilled in the art.

EXAMPLE 1.

A continuous horizontal processing system (as described in U.S. PA 61/480,521) had previously been pasteurizing containers of apple segments in light syrup. The thermal conductivity of the mixture was 0.42 W/m/° C. The thermal conductivity of the container, a polymer pouch, was 0.36 W/m/° C. The thermal transfer medium used for product heating and holding phases was a 75% glycerol:25% deionised water mixture which had a thermal conductivity of 0.36

W/m/° C. and was maintained at a temperature 15° C. higher than the food container and its contents throughout the heating phases. It was maintained at 107° C. during the holding phase.

The thermal transfer medium used for product cooling phase was also a 75% glycerol:25% deionised water mixture which had a thermal conductivity of 0.36 W/m/° C. and was maintained at a temperature of 25° C. below the food container throughout the cooling phase so that successive cooling tanks contained thermal processing media at 82° C., 53° C. and 25° C. Product exited the system at an internal temperature of 31° C. and was then allowed to equilibrate to external temperature (17° C.)

The product was replaced with a 'beans in tomato sauce' product for sterilizing in a stand-up polymer pouch. The beans, which were 84% of the product composition had a thermal conductivity of the mixture was 0.28 W/m/° C. The thermal conductivity of the sauce (made from pulverized whole tomatoes) was 0.39 W/m/° C. The overall thermal conductivity of the food product was 0.30 W/m/° C. The thermal conductivity of the polymer pouch was 0.30 W/m/° C. The thermal processing medium used for heating and holding the pasteurized product was pumped from the system to a holding tank via a heat exchanger. It was held at 40° C. until needed.

As the new product required sterilization, it was replaced with a thermal transfer medium for product heating and holding phases containing 30% (food grade) glycerol:34% (food grade) propylene glycol, 30% (food grade) tripropylene glycol and 6% deionised water; this mixture which had a thermal conductivity of 0.30 W/m/° C. As the previous thermal processing medium was removed and passed through the heat exchanger, the new thermal processing mixture was preheated by the exiting medium and the sterilizing medium was maintained at a temperature 15° C. higher than the food container and its contents throughout the 3 continuous heating phases. It was maintained at 128° C. during the thermal holding process until sterilization was deemed complete.

The thermal transfer medium used for product cooling phase was a 75% glycerol:25% deionised water mixture which had a thermal conductivity of 0.36 W/m/° C. and was maintained at a temperature of 25° C. below the food container throughout the cooling phase so that successive cooling tanks contained thermal processing media at 107° C., 79° C., 50° C. and 25° C. Product exited the system at an internal temperature of 32° C. and was then allowed to equilibrate to external temperature (16° C.).

The invention claimed is:

1. A method of thermally processing food and drink products during heating, holding, and/or cooling phases, comprising:
    subjecting the food and drink products or containers for the food and drink products into contact with a thermal transfer and processing medium, comprised of a variable mixture of components, all said components approved for direct contact with food and drink products or containers for the food and drink products,
    during the heating, holding, and/or cooling phases, modifying or adjusting the chemical composition of the heat transfer and processing medium as needed to maintain the physical properties of the thermal transfer and processing medium optimum to the thermal conductivity and thermal diffusivity properties of the food or drink products and/or containers for the food or drink products during the heating, holding, and/or cooling phase,
    wherein the thermal transfer and processing medium is neither water nor steam and remains a liquid without exhibiting any change of state, and
    wherein the thermal transfer and processing medium comprises propylene glycol and/or polypropylene glycol.

2. A method according to claim 1, further comprising pressurizing the food and drink product or packaging for the food and drink product during processing with unheated compressed air or gas.

3. A method according to claim 2, comprising using the composition of said gas to change, modify, or control a gaseous composition of a container for the food and drink product.

4. A method according to claim 1, further comprising preventing the liquid thermal transfer and processing medium from changing to a solid or gaseous state during any step of the thermal process.

5. A method according to claim 1, comprising using a diluent in the thermal transfer and processing medium, said diluent comprising any suitable liquid or combination of liquids comprising aliphatic alcohols and/or water, approved for direct contact with food and food products.

6. A method according to claim 1, wherein the thermal transfer and processing medium further comprises glycerol.

7. A method according to claim 5, wherein the thermal transfer and processing medium for the heating, holding, and cooling phases contains less than 30% diluent and is maintained between −20° C. and +150° C.

8. A method according to claim 1, wherein a composition of the thermal transfer and processing medium is modified to maintain the thermal conductivity and thermal diffusivity properties of the thermal transfer and processing medium optimal to the thermal conductivity properties of the product and container being processed to any designated processed state.

9. A method according to claim 6, wherein the content of each of glycerol, propylene glycol, and polypropylene glycol in the thermal transfer and processing medium is in the range 0.1% to 80%.

10. A method according to claim 1, wherein a chain length of a propylene glycol molecule is any suitable number.

11. A method according to claim 1, wherein the polypropylene glycol is dipropylene glycol or tripropylene glycol.

12. A method according to claim 1, wherein the thermal process includes stabilization, pasteurization, or sterilization.

13. A method according to claim 1, wherein the thermal transfer and processing medium is a non-ionic liquid and is permanently maintained in a non-corrosive state.

14. A method according to claim 5, wherein the thermal transfer and processing medium comprises a different ratio of non-ionic liquid to diluent for each of the heating, holding, and cooling phases.

15. A method according to claim 1, wherein the thermal transfer and processing medium comprises glycerol and wherein absorption of water in said glycerol is controlled through addition of non-ionic components, in particular said propylene glycol and/or polypropylene glycol.

16. A method according to claim 15, wherein a moisture content of 40% or lower, and preferably 28% or lower, is maintained in the atmosphere surrounding the thermal transfer and processing medium.

17. A method according to claim 1, further comprising selecting the specific density of the thermal transfer and processing medium to minimize or eliminate the need for additional pressurization of the food and drink products.

18. A method according to claim 1, further comprising selecting the components of the thermal transfer and processing medium to have a thermal conductivity in the range of 0.158 to 0.40 W/m/degree Celsius.

* * * * *